W. S. KERN.
APPARATUS FOR SEPARATING THE SOLID AND LIQUID CONSTITUENTS OF FRUIT AND VEGETABLES.
APPLICATION FILED AUG. 27, 1912.
1,053,184.
Patented Feb. 18, 1913.
4 SHEETS—SHEET 4.
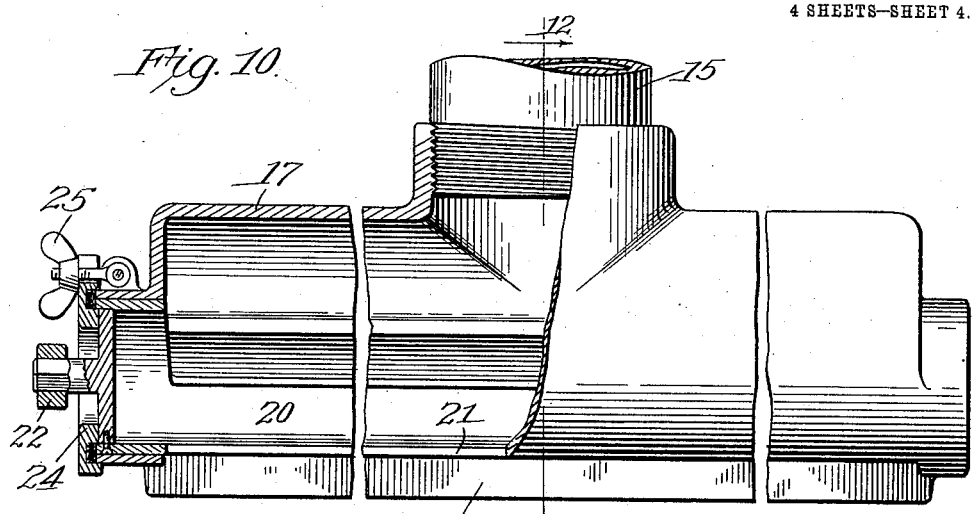
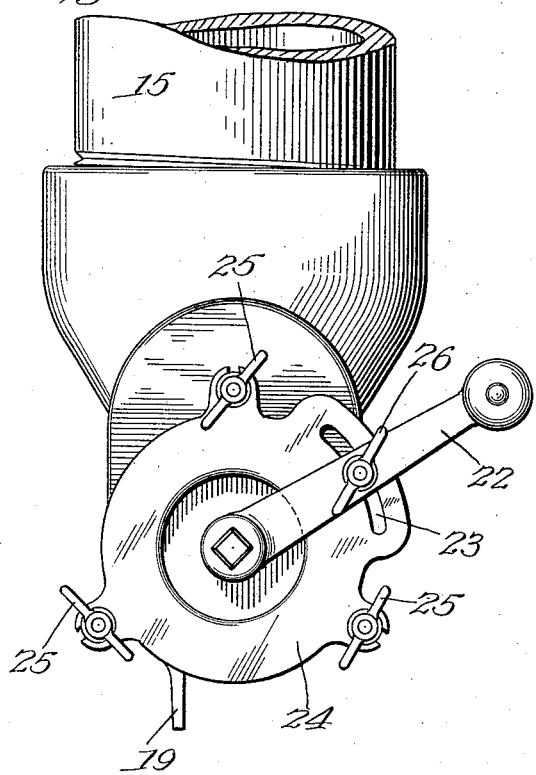
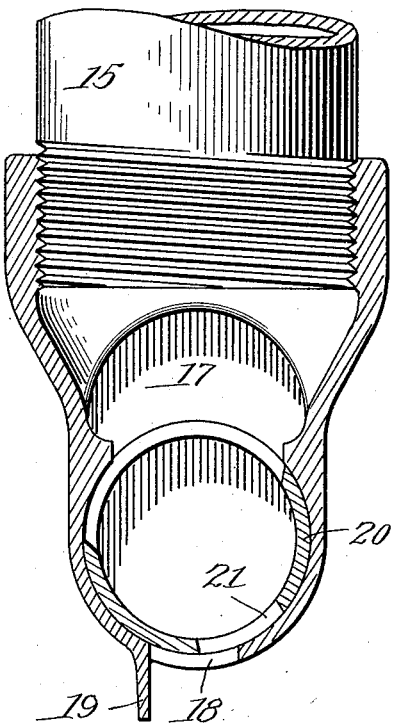

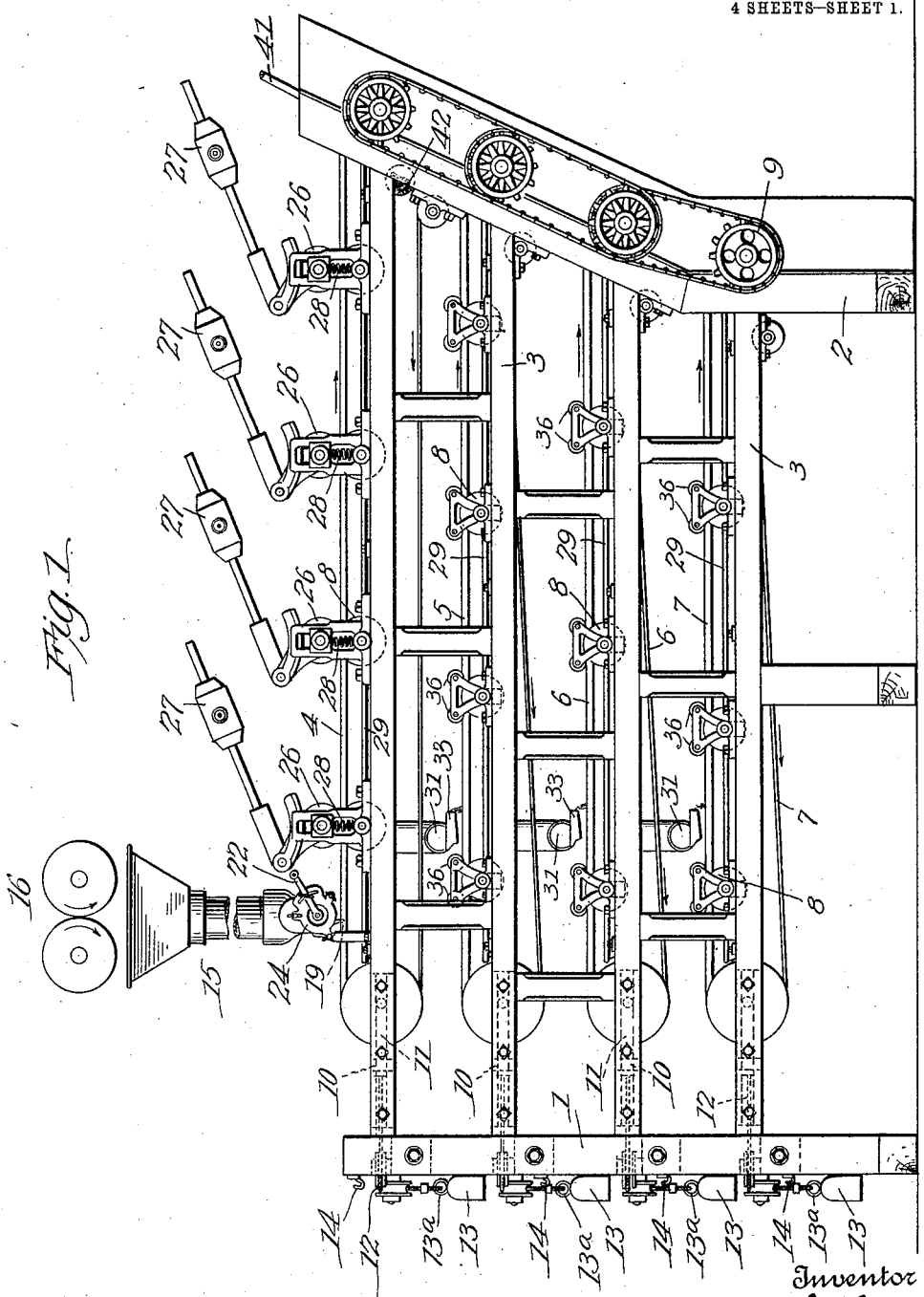

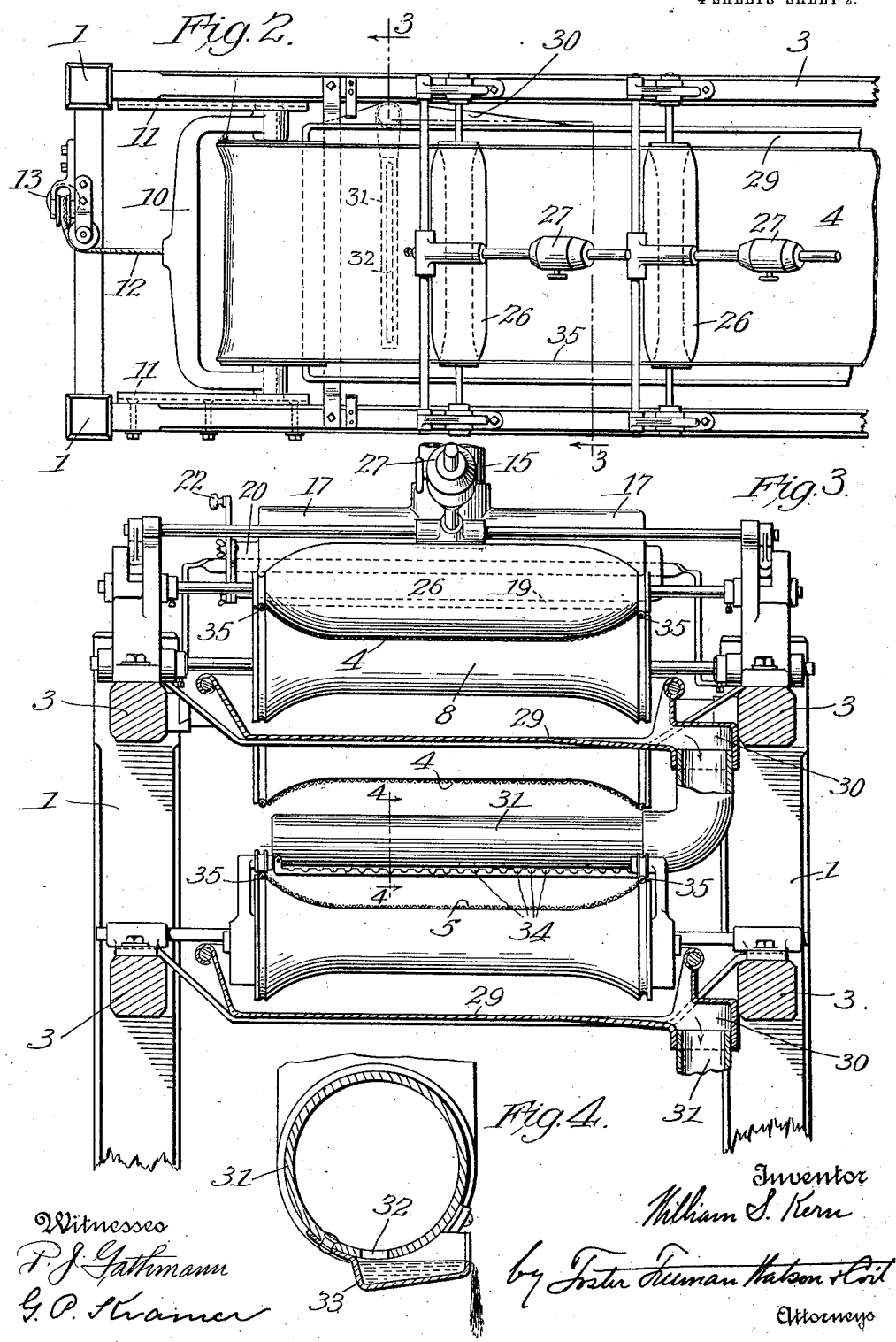

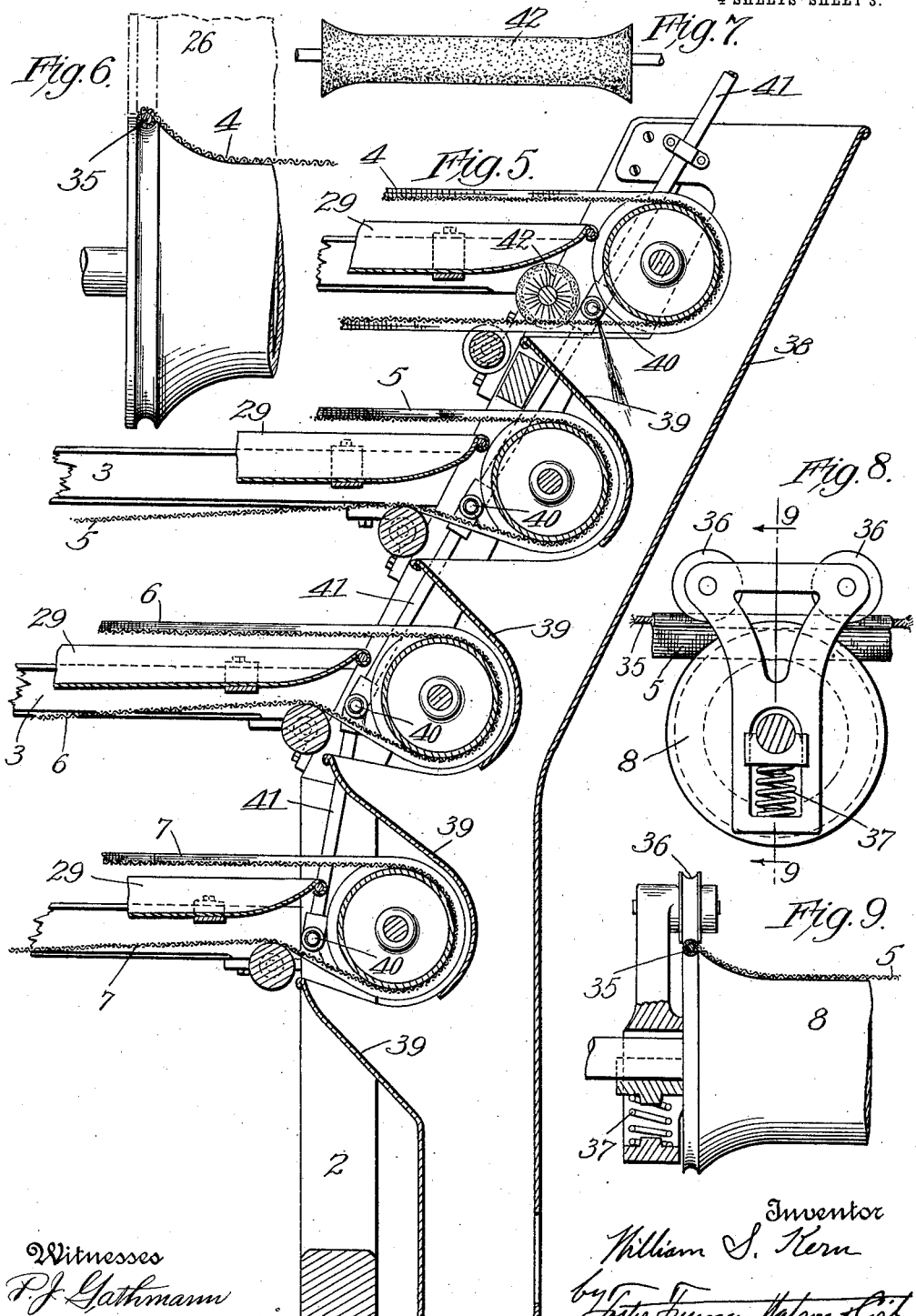

UNITED STATES PATENT OFFICE.

WILLIAM S. KERN, OF WILKES-BARRE, PENNSYLVANIA.

APPARATUS FOR SEPARATING THE SOLID AND LIQUID CONSTITUENTS OF FRUIT AND VEGETABLES.

1,053,184.	Specification of Letters Patent.	Patented Feb. 18, 1913.

Application filed August 27, 1912. Serial No. 717,271.

*To all whom it may concern:*

Be it known that I, WILLIAM S. KERN, a citizen of the United States, and resident of Wilkes-Barre, Luzerne county, State of Pennsylvania, have invented certain new and useful Improvements in Apparatus for Separating the Solid and Liquid Constituents of Fruit and Vegetables, of which the following is a specification.

The present invention relates to improvements in means for separating the liquid and solid constituents of fruit, vegetables or similar material, and the embodiment thereof illustrated in the accompanying drawings is particularly designed for use in separating the juice of grapes from the skins, pulp and seeds of such fruit.

In the drawings, Figure 1 is a side elevation of a machine or apparatus constructed in accordance with the invention; Fig. 2 is a plan view of a portion of the machine; Fig. 3 is a transverse vertical sectional view substantially on the line 3—3 of Fig. 2; Fig. 4 is a detail sectional view, on an enlarged scale, on the line 4—4 of Fig. 3; Fig. 5 is a vertical sectional view through one end of the apparatus, the parts being shown on a larger scale than in Fig. 1; Fig. 6 is a detail view of a portion of one of the supporting rolls and the means for holding a filter belt in place thereon; Fig. 7 is a detail view of a brush or cleaning device for the primary separating or filter belt; Figs. 8 and 9 illustrate in side elevation and section of one of the auxiliary or idler supporting rolls for the fiber belts; Figs. 10 to 12 are detail views on an enlarged scale of the valve device controlling the supply to the apparatus of material to be treated.

Referring to the drawings it will be seen that the apparatus comprises a plurality of endless, pervious belts mounted on suitable guide and driving rolls that are supported by a framework including uprights 1 and 2 and a series of horizontal connecting bars or members 3. There are, as shown, four of said belts, 4, 5, 6, and 7, each of which is supported on two drums and has its upper section extending over an intermediate series of idler rolls 8. The shafts of the supporting rolls for the several belts that are mounted in the upright 2 are provided with sprockets which are interconnected by suitable chains so that motion communicated to a driving pulley 9 on one of said shafts will cause all of the belts to move at the desired speed and in the same direction. To maintain the several belts properly taut at all times the supporting roll thereof adjacent to upright 1 of the frame is preferably supported by a yoke 10 the ends of which are fitted in horizontal guides 11 on the main frame and which is connected by a cable 12 with a weight 13, suitable guide pulleys being provided on the upright end. The belt may be relieved of the tension of the weight 13 by engaging an eye 13$^a$ with a hook 14 and the belt being thus relieved from said weight can have its ends disconnected so as to be readily removed from the supporting rolls, for purposes of cleaning or repair.

The belts may be of any suitable material the mesh of each varying from that of the others and the several being so arranged that the upper or primary belt 4 will more freely permit the passage of liquid than any of the others, while the lowest of the series will be of the closest texture. Preferably the primary belt 4 will be made of woven wire the openings of which will be sufficiently small to exclude the larger particles of solid matter, such as the skins, seeds and considerable of pulp of grapes. The belts 5, 6, and 7 may be of fibrous textile material the two intermediate ones for example being of cheese-cloth of different grades while the lowest belt 7 may be of flannel. As the material passing through each of the belts, as hereinafter explained, is conducted successively through all of the lower belts it will be seen that by employing belts of the character referred to all of the solid material will be separated from the liquid.

The material to be treated is delivered on to the upper surface of the belt 4 through a conduit or supply pipe 15 which may receive material directly from a crushing apparatus conventionally illustrated at 16. The conduit or supply pipe 15 terminates in a head 17 that extends transversely of the belt 4 and is provided with a downwardly opening slot 18. Depending from said head and at one side of the discharge slot 18 therein is a rib or flange 19 which extends into close proximity to the upper surface of the belt 4 and prevents material delivered thereon from flowing rearwardly. The discharge of material from the supply pipe 15 is controlled by a rotary valve 20 fitted within the head 17 and projecting through one end thereof, said valve having suitable slots formed therein and one of which, 21, is adapted to be moved to aline more or less with the slot 18 in the head, so that the extent of opening of said discharge slot may be varied as required. The end of the valve 20 which projects beyond the head 17 of the supply pipe is provided with a lever 22 having a pin extending into a slot 23 formed in a cover or head plate 24 that is detachably connected with the head 17 by means of suitable threaded members and nuts 25. By means of a thumb nut 26 the lever 22 may be locked to the plate 24 so as to maintain the slots 18 and 21 in any desired relation and by loosening the nuts 25 it will be seen that the entire valve may be withdrawn from the head of the supply pipe so that it can be readily cleaned.

Coöperating with the idler rolls 8 of the upper belt are a series of distributing or pressing rolls 26 to which are connected counter weights 27 so that the rolls are maintained in relatively close contact with the upper surface of the belt. Springs 28 act to constantly move said rolls 26 in opposition to the weights 27 to insure that said rolls will bear with a minimum amount of pressure on the belt, their function being primarily to uniformly distribute the mixed, solid and liquid, material over the surface of the belt.
Between the upper and lower sections of each of the belts is supported a pan-like receptacle 29 to receive all of the material which passes through the upper section of the belt. This receptacle is provided adjacent one end with a lateral projection 30 and said receptacle is so supported that material falling therein tends to flow toward this extension. A pipe 31 communicates with an opening in the bottom of the lateral extension 30 of each of said receptacles, except the lowest, and extends downwardly and laterally into position to discharge on to the upper surface of the next lower belt of the series. The pipe 31 is provided with means whereby the material discharged therefrom is delivered uniformly throughout the width of the belt traveling beneath it. As shown, the pipe is provided with a discharge slot 32 beneath which is arranged a trough-like member 33 over the upper edge of which the material flows on to the next belt of the series. This wall of the trough 33 is provided with a series of closely adjacent notches 34 so that the material is discharged in a series of streams.

Preferably the belt supporting rolls are made of spool shape and provided at their ends with peripheral grooves adapted to receive cords or cables 35 secured at the edges of the belts, the several pressers and the auxiliary rolls hereinafter referred to being provided with corresponding grooves. The upper belt 4 is held in close relation to its idlers 8 by the distributing rolls 26 as above described, and with the idler rolls of the other belts coöperate a series of auxiliary rolls 36. As shown, these auxiliary rolls are arranged in pairs carried by frames mounted on the shafts of the idler rolls and springs 37 are provided to maintain the contact between said auxiliary rolls and the cords or cables at the side edges of the filter belts.

As shown in Figs. 1 and 5 the several belts are in different lengths so that the driving members thereof extend in an inclined line, the upper belt projecting some distance beyond the other belts in the series. Surrounding these projecting ends of the several belts is a receptacle 38 into which the solid material collected on the belts is discharged. As shown in Fig. 5 each of said belts extends for some distance into said receptacle, shields 39 being interposed between the several belts to prevent the material being discharged from any one belt falling upon a lower one. While the larger portion of solid material adhering to the belts would naturally fall into the receptacle 38 as the belt passed around its outer supporting roll, means are preferably provided for insuring that particles adhering to a belt after passing said roll will be detached. As shown, these means comprise a series of blast pipes, one extending between the sections of each belt and having a plurality of apertures so positioned as to discharge blasts of air downwardly through the adjacent section of the belt, the several pipes 40 being connected to a common supply pipe 41 adapted to be connected with any suitable means for delivering air under pressure. As the larger amount of the solid material will be removed by the upper or primary belt and as this is preferably made of material having therein apertures of considerable size, it is also sometimes desirable to provide an auxiliary cleaning device such as a wire brush 42 which is mounted immediately in the rear of the blast pipe 40 associated with the upper belt, the bristles of which are adapted to extend into and through the meshes in the lower section of the belt as the latter passes beneath it.

The manner of using and the advantages of the apparatus herein described will be readily understood and appreciated. It will be seen that the mixed solid and liquid material will be initially delivered on the upper belt and as the latter travels, such portions as do not immediately pass through the belt will be conducted beneath the several rolls 26. All of the liquid and some of the solid material will thus be delivered into the upper receptacle 29 from which it will pass to the second belt 5 and the material collected in the pan beneath the upper section of this belt will be delivered on to the belt 6 and thereafter to the belt 7. From the lowest receptacle 29 the liquid can be withdrawn as desired.

In the foregoing description it has been assumed that the solid material which does not pass through the several belts is the waste, but it is evident that the apparatus is clearly applicable for treating material where the solid parts are the valuable ones and the liquid is the waste product.

Having thus described the invention what I claim and desire to secure by Letters Patent is:—

1. In an apparatus for the purpose described, the combination of a plurality of traveling filter belts arranged at different elevations, means for supplying liquid and solid material to the upper belt, a receptacle adjacent each belt to receive material passing therethrough, and means for conducting the contents of each receptacle except the lowest to a lower belt.

2. In an apparatus for the purpose described, the combination of a plurality of traveling filter belts arranged one above another, means for supplying liquid and solid material to the upper belt, a receptacle arranged beneath the operative run of each belt to receive material passing therethrough, and a conduit leading from each receptacle except the lowest and adapted to discharge onto a lower belt.

3. In an apparatus for the purpose described, the combination of a plurality of traveling filter belts arranged one above another, means for supplying liquid and solid material to the upper belt, a receptacle arranged beneath the operative run of each belt to receive material passing therethrough, and a conduit leading from each receptacle except the lowest and having an elongated discharge opening that extends transversely of a lower belt.

4. In an apparatus for the purpose described, the combination of a plurality of endless filter belts arranged one above the other, means for driving all of the belts, a plurality of pressure and distributing rolls coöperating with the operative section of the upper belt, a receptacle arranged below the operative section of each belt to receive material passing therethrough, means for conducting material from each receptacle except the lowest to a lower belt, and a receptacle for material that will not pass through the belt into which all of the belts are adapted to discharge.

5. In an apparatus for the purpose described, the combination of a primary foraminous metal belt, adapted to initially receive the liquid and solid material to be separated, a receptacle arranged below the operative section of said belt, a textile belt arranged at a lower level and adapted to receive the contents of said receptacle, and a receptacle for receiving the liquid that is filtered through the textile belt.

6. In an apparatus for the purpose described, the combination of a primary foraminous metal belt, adapted to initially receive the liquid and solid material to be separated, a receptacle arranged below the operative section of said belt, a plurality of textile belts arranged on levels below and the upper one of which is adapted to receive material discharged by said receptacle, a receptacle below the operative run of each textile belt and means for conducting the contents of each receptacle except the lowest to a textile belt.

7. In an apparatus for the purpose described, the combination of a plurality of belts arranged one above another and each permitting the passage of liquid, a receptacle adjacent each belt to receive material passing therethrough, a conduit leading from each receptacle except the lowest to a lower belt, means for causing each belt to discharge the solid material collecting thereon, and a receptacle common to all of the belts for receiving such solid material.

8. In an apparatus for the purpose described, the combination of a plurality of belts arranged one above another and each permitting the passage of liquid, a receptacle adjacent each belt to receive material passing therethrough, a conduit leading from each receptacle except the lowest to a lower belt, and means for forcing a blast of air through each belt to detach particles of solid material adhering thereto.

9. In an apparatus for the purpose described, the combination of a plurality of belts of pervious material arranged one above another, a receptacle arranged between the sections of each belt, a conduit leading from each receptacle except the lowest and having a discharge opening extending transversely of the upper section of a lower belt, and means for discharging a blast of air through the lower section of each belt to detach adhering solid material.

10. In an apparatus for the purpose described, the combination of a plurality of superposed, separated, pervious, endless belts, means for driving said belts, means for conducting material passing through each belt except the lowest to a lower belt, and means for freeing each belt from adhering solid material.

11. In an apparatus for the purpose described, the combination of a plurality of superposed, separated, pervious, endless belts, a receptacle arranged between the upper and lower sections of each belt, a conduit leading from each receptacle, except the lowest, to discharge its contents onto the upper surface of a lower belt, a perforated pipe extending transversely of each belt, between the sections thereof, and means for supplying air under pressure to each of said pipes.

12. In an apparatus for the purpose described, the combination of a plurality of superposed, separated, pervious, endless belts, a receptacle arranged between the upper and lower sections of each belt, a conduit leading from each receptacle, except the lowest, to discharge its contents onto the upper surface of a lower belt, a perforated pipe extending transversely of each belt, between the sections thereof, means for supplying air under pressure to each of said pipes, and a receptacle arranged to receive solid material detached from the belts by the blasts discharged by said pipes.

13. In an apparatus for the purpose described, the combination of a plurality of superposed, vertically separated, filtering belts, means for supplying mixed solid and liquid material to the upper belt including a duct or conduit terminating in a laterally projecting head that extends transversely of the belt, an adjustable valve carried by said head and adapted to control the discharge of material therefrom, a receptacle arranged adjacent each belt to receive material passing therethrough, and a conduit leading from each receptacle except the lowest and adapted to discharge onto a lower belt.

14. In an apparatus for the purpose described, the combination of a plurality of superposed, vertically separated, filtering belts, means for supplying mixed solid and liquid material to the upper belt including a duct or conduit terminating in a laterally projecting head that extends transversely of the belt, a rotary valve detachably fitted within said head and adjustable to control the discharge of material therefrom, a receptacle arranged adjacent each belt to receive material passing therethrough, and a conduit leading from each receptacle except the lowest and adapted to discharge onto a lower belt.

15. In an apparatus for the purpose described, the combination of a plurality of superposed, vertically separated, filtering belts, means for supplying mixed solid and liquid material to the upper belt including a duct or conduit terminating in a laterally projecting head that extends transversely of the belt and is provided with a downwardly opening discharge slot, a valve comprising a tubular slotted body rotatably mounted in said head and adapted to cover and uncover the discharge slot, a receptacle arranged adjacent each belt to receive material passing therethrough, and a conduit leading from each receptacle except the lowest and adapted to discharge onto a lower belt.

16. In an apparatus for the purpose described, the combination of a plurality of superposed, vertically separated, filtering belts, means for supplying mixed solid and liquid material to the upper belt including a duct or conduit terminating in a laterally projecting head that extends transversely of the belt, and is provided with a downwardly opening discharge slot, said head having a depending projection extending along the rear edge of the discharge slot, a valve adapted to vary the extent of opening of said slot, a receptacle arranged adjacent each belt to receive material passing therethrough, and a conduit leading from each receptacle except the lowest and adapted to discharge onto a lower belt.

17. In an apparatus for the purpose described, the combination of a plurality of vertically separated, pervious, endless belts, each belt having one end projected beyond the corresponding end of the belt beneath it, a receptacle supported to receive material passing through each belt, means for conducting the contents of each of said receptacles, except the lowest, on to a lower belt, a receptacle into which all of the aforesaid overhanging ends of the belts are adapted to discharge, and means coöperating with the overhanging end of each belt for detaching solid material therefrom.

In testimony whereof I affix my signature in presence of two witnesses.

WILLIAM S. KERN.

Witnesses:
JOHN P. POLLOCK,
GEO. E. KELLY.

Copies of this patent may be obtained for five cents each, by addressing the "Commissioner of Patents, Washington, D. C."